United States Patent [19]

Johnson

[11] Patent Number: 4,460,558

[45] Date of Patent: Jul. 17, 1984

[54] RECOVERY OF CARBON BLACK

[75] Inventor: Paul H. Johnson, Bartlesville, Okla.

[73] Assignee: Phillips Petroleum Company, Bartlesville, Okla.

[21] Appl. No.: 308,062

[22] Filed: Oct. 2, 1981

[51] Int. Cl.³ .................... C01B 31/02; C09C 1/48
[52] U.S. Cl. .................... 423/450; 423/449; 423/567 R; 23/314; 34/36
[58] Field of Search .......... 423/449, 450, 461, 567 R; 422/150; 23/314; 34/36

[56] References Cited

U.S. PATENT DOCUMENTS

| | | | |
|---|---|---|---|
| 2,375,795 | 5/1945 | Krejci | 23/209.8 |
| 2,567,700 | 9/1951 | Ehlschlager | 175/183 |
| 2,672,402 | 3/1954 | Stokes | 23/209.8 |
| 2,952,921 | 9/1960 | Wood et al. | 23/314 |
| 3,116,119 | 12/1963 | Osburn et al. | 422/150 |
| 3,165,522 | 1/1965 | Dye | 23/259.5 |
| 3,362,790 | 1/1968 | Wood et al. | 23/259.5 |
| 3,369,870 | 2/1968 | Gonz et al. | 23/209.4 |
| 3,401,020 | 9/1968 | Kester et al. | 23/209.4 |
| 3,409,406 | 11/1968 | Murray | 23/259.5 |
| 3,411,885 | 11/1968 | Malmstrom et al. | 23/209.6 |
| 3,490,869 | 1/1970 | Heller | 23/209.4 |
| 3,560,164 | 2/1971 | Venable | 23/259.5 |
| 4,206,192 | 6/1980 | Austin | 423/455 |
| 4,296,087 | 10/1981 | Lewis | 423/450 |
| 4,393,034 | 7/1983 | Smith | 423/450 |

FOREIGN PATENT DOCUMENTS

| | | | |
|---|---|---|---|
| 215809 | 5/1957 | Australia | 423/450 |
| 650246 | 10/1962 | Canada | 423/450 |
| 54-9190 | 1/1979 | Japan | 423/449 |
| 1151416 | 5/1969 | United Kingdom | 423/450 |

OTHER PUBLICATIONS

Patent application Ser. No. 145,570, filed May 1, 1980 by O. K. Austin.
Chemical Engineering Thermodynamics, First Ed., McGraw-Hill, NY, 1944 by Barnett F. Dodge, pp. 480-482.
Elements of Fractional Distillation, Fourth Ed., McGraw-Hill, 1950, by C. S. Robinson & E. R. Gilliland, pp. 150-151.

Primary Examiner—Gregory A. Heller

[57] ABSTRACT

A heretofore waste gas stream containing nitrogen is used in the manufacture of carbon black.

10 Claims, 5 Drawing Figures

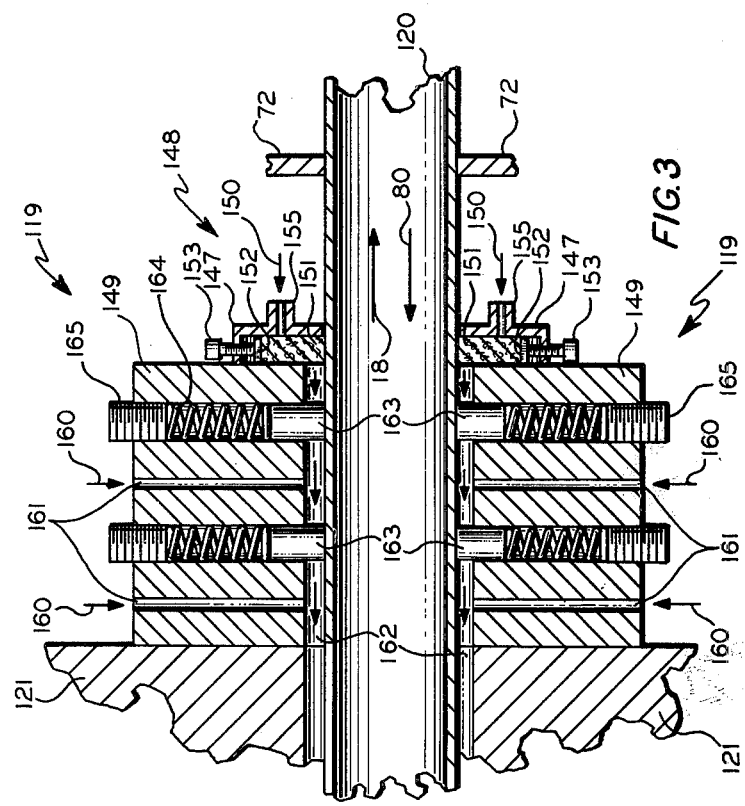

RECOVERY OF CARBON BLACK

This invention relates to the production of carbon black. In one aspect, this invention relates to the recovery of energy from energy-containing streams in carbon black manufacture. In another aspect, this invention relates to the use of a nitrogen-enriched gaseous stream to aid in the drying and recovery of carbon black.

BACKGROUND OF THE INVENTION

Carbon black is conventionally produced by decomposing an oil. Typically, an oil is fed to a ceramic-lined reactor having a cylindrical, elongated reaction zone. Hot combustion gases are also fed to the reactor and contact the feed oil either tangentially or coaxially. The hot combustion gases can be derived from the combustion of a fuel with a free oxygen-containing gas such as air or pure oxygen alone or oxygen admixed with another gaseous stream. The carbon black reaction is generally controlled or terminated by injecting a quench fluid such as water at a predetermined location along the reaction zone.

The carbon black so-produced is transported from the reactor by cooled reaction off gases to a carbon black recovery system. The carbon black containing gaseous stream leaving the reactor typically is passed through a separation zone. In the separation zone, the particles of carbon black are separated from the gaseous stream by means of a separation device such as a filter. The particles of carbon black so separated are very fine, dusty, and difficult to handle. For ease of handling, the fine particles of carbon black can be shaped into pellets by admixing the particles with a liquid pelleting agent such as water. Excess pelleting agent is removed from the pellets by means of drying the pellets in a drying chamber such as a rotary dryer. The drying chamber is conventionally heated by a heating medium derived from the combustion of a fuel with a free oxygen-containing gas. The heating medium typically surrounds the shell of the drying chamber containing the pellets of carbon black. It is known to take a small stream of the heating medium and to pass the small stream into the shell of the drying chamber in contact with the pellets of carbon black. This small stream is called a "purge gas" stream. The purge gas is utilized to aid in the removal of the pelleting agent from the pellets that are being dried. The pellets so-dried are recovered as the carbon black product.

Air can be separated into oxygen and nitrogen and other components by a separation means such as low temperature fractionation, etc. The pure or near pure oxygen can be used in the combustion of a fuel to provide hot combustion gases to decompose the feed oil in the carbon black reactor. U.S. Pat. No. 2,672,402, for example, describes the use of relatively pure oxygen as a component of hot combustion gases used for reactor feed.

The by-products of oxygen manufacture such as nitrogen have not heretofore been utilized in carbon black manufacture.

THE INVENTION

It is an object of this invention to recover energy that is dissipated during the complete quenching of a carbon black reaction.

It is another object of this invention to utilize nitrogen obtained from an air separation unit in the manufacture of carbon black.

It is still another object of this invention to utilize a nitrogen-enriched stream to recover energy from various energy-rich streams found in the manufacture of carbon black.

It is another object of this invention to provide a control system wherein the amount of oxygen present in a carbon black dryer is controlled.

These and other objects, advantages, details, features, and embodiments of this invention will become apparent to those skilled in the art from the following detailed description of the invention, the appended claims, and the drawings in which, FIG. 1 shows the use of a nitrogen-enriched stream and heat exchange devices in the recovery of energy from energy-rich streams found in carbon black manufacture and the use of a nitrogen-enriched gaseous stream as a purge gas for drying chamber.

FIG. 3 shows a drying chamber seal having a nitrogen-enriched purge gas.

Figure 4A:
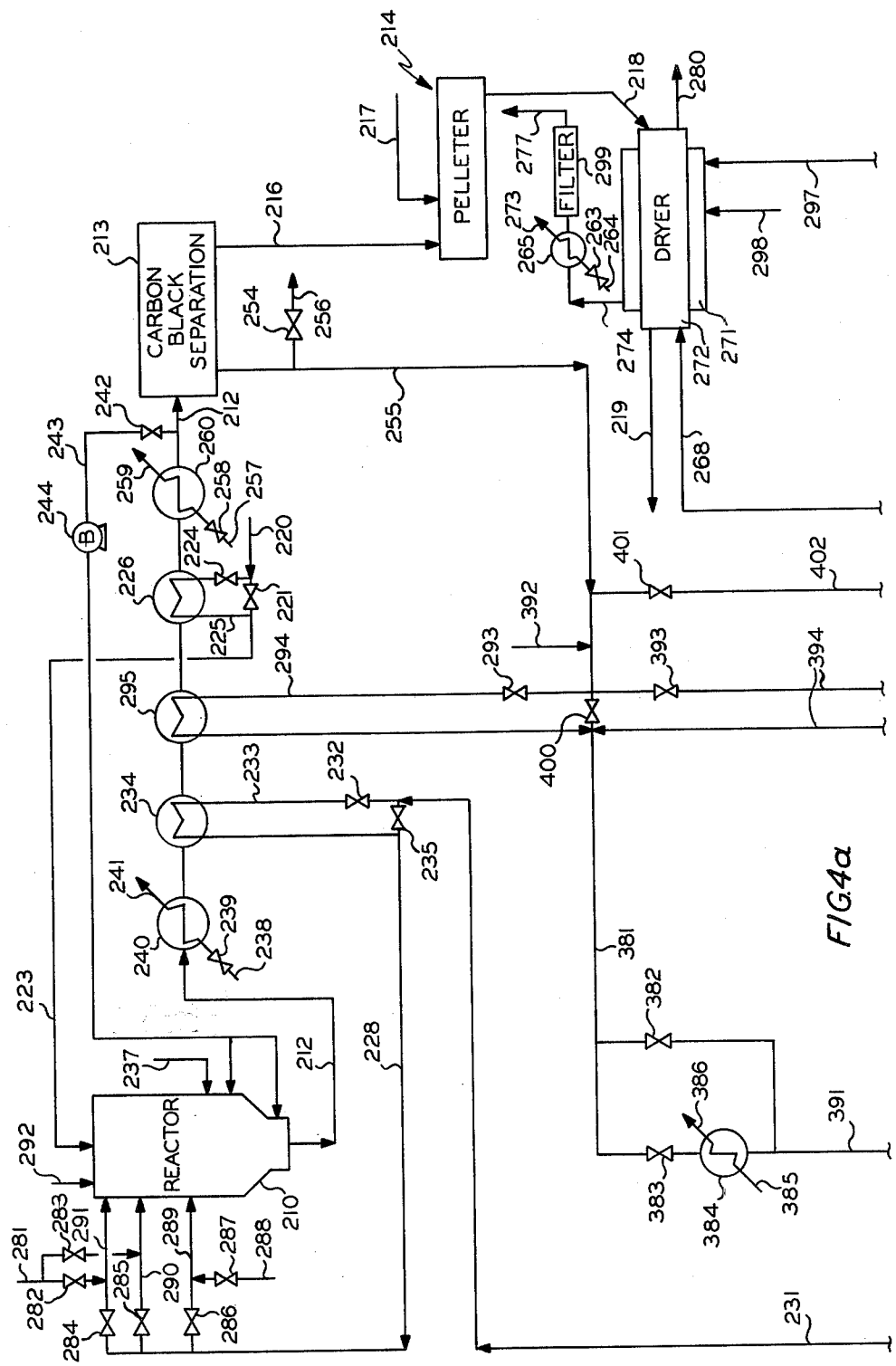

FIGS. 4a and b show a plant suitable for producing two different types of carbon black utilizing a nitrogen-enriched gaseous stream.

In accordance with this invention, a nitrogen-enriched gaseous stream is utilized in the manufacture of carbon black. The nitrogen-enriched stream can be used in conjunction with heat exchange devices to recover energy from streams containing energy found in carbon black manufacture. The nitrogen-enriched stream also can be utilized as a purge gas for a drying chamber. It is desirable to minimize the amount of oxygen present in the drying chamber since excess oxygen partially oxidizes carbon black, undesiredly changes some properties of the carbon black, and causes the formation of undesirable, acidic compounds. A nitrogen-enriched stream can be used as a purge gas in order to control the oxygen concentration in the drying chamber to less than about 5% free oxygen by volume based on total volume of dry gas (absent water vapor) present in the drying chamber.

In accordance with an embodiment of this invention, energy is recovered from a process stream containing energy found in the manufacture of carbon black. An indirect heat exchange device such as a shell and tube heat exchanger is utilized. A gaseous stream containing at least 95 volume per cent nitrogen is passed through a first portion of the heat exchange device. For example, the nitrogen-rich stream can be passed through the shell or the tube side of a shell and tube heat exchanger. Then, the stream containing energy can be passed through a second portion of the heat exchange device. Energy can be transferred from the energy rich stream to the gaseous stream containing at least 95 volume percent nitrogen (dry gas basis) which has an energy content less than that of the energy rich stream. The transfer of energy is by means of the heat exchange device.

In one variation of this embodiment, the gaseous stream containing at least 95 volume percent nitrogen is waste nitrogen derived from the separation of air into nitrogen, oxygen, and other components. Nitrogen which was heretofore discarded in a carbon black manufacture utilizing oxygen recovered from an air fractionation can be advantageously used in the recovery of energy. In this variation a waste nitrogen stream can be utilized to recover waste energy.

In another variation of this embodiment, the process stream containing energy found in the manufacture of carbon black is an effluent stream from a carbon black separation system. A gaseous stream containing particles of carbon black and significant amounts of heat or thermal energy is typically passed to a separation system such as a filtration zone. In the separation system, separation devices such as filters remove nearly all the carbon black particles from the gaseous stream. The gaseous stream is then vented to the atmosphere or utilized in another process application. Since the gaseous stream is down-stream from the carbon black reactor, the gaseous stream contains significant amounts of heat or thermal energy. If this gaseous stream is vented to the atmosphere, the energy is lost. In this variation of this embodiment, a heat exchange device such as a heat exchanger is preferably located in the separation system gaseous stream exit conduit. A gaseous stream containing at least 95 volume percent nitrogen (dry gas basis) can then be also directed to the heat exchange device. By means of the heat exchange device, heat or thermal energy can then be transferred from the gaseous stream containing energy leaving the separation system to the gaseous stream containing nitrogen by indirect heat exchange. Thus, the nitrogen-enriched stream can be utilized to recover energy from the gaseous stream containing energy which is an effluent from the manufacture of carbon black.

In another variation of this embodiment, energy is recovered from a gaseous stream which is the effluent from a drying chamber. A drying chamber is typically used to remove a pelleting agent from pellets of carbon black. A drying chamber can be heated by a heating medium such as hot gases, hot liquids, steam, and other suitable heat transfer medium. A heating medium for example conventionally surrounds the shell of a rotary dryer. The pellets of carbon black containing a pelleting agent are inside the shell of the drying chamber. The heating medium provides the energy to vaporize the pelleting agent from the pellets. Not all of the thermal energy contained by the heating medium is transferred to the drying chamber. Thus, the heating medium effluent from the heating chamber contains considerable energy. A heat transfer device can be positioned in the heating medium exit conduit from the drying chamber. A gaseous stream containing at least 95 volume percent nitrogen can also be directed to the heat transfer device. Thermal energy can thus be transferred by means of the heat transfer device from the heating medium effluent from the drying chamber to the gaseous stream containing at least 95 volume percent nitrogen. Energy thus can be recovered from the heating medium effluent stream.

In another variation of this embodiment, energy is recovered from a process stream containing energy which stream is the partially quenched effluent from a carbon black reactor. Typically, in a carbon black reactor, reaction temperatures range from about 2400° F. to about 2900° F. Conventionally to control and/or terminate the reaction, a quench fluid such as water or a cooler reactor effluent is injected into the reaction zone to reduce the temperature in the reactor to a temperature in the range of about 1200° F. to about 2000° F. Quench fluids such as water, steam, and cooled gases are known. The effluent from the carbon black reactor prior to quenching contains significant amount of thermal energy. When the reactor effluent is completely quenched, the thermal energy is dissipated and cannot be recovered. In this variation of this embodiment, the reactor effluent is only partially quenched. That is, a desired amount of quench fluid is injected into the reaction zone to reduce the temperature in the reactor from carbon black formation temperatures to a temperature in the range of about 1800° F. to about 2000° F. This initial quench can be used to reduce the temperature of the reactor effluent to a point wherein a high pressure steam boiler or heat exchange devices such as heat exchangers having a tube-shell configuration can be placed in contact with the reactor effluent. Temperatures much in excess of 2000° F. are too severe for a high pressure steam boiler or other heat exchange equipment. After the initial quench, a second heat exchange device can be positioned in contact with the still energy rich reactor effluent stream. The now cooled reactor effluent can further be indirectly heat exchanged with other process streams such as the oxygen charged to the carbon black reactor or the carbon black feed-stock to the reactor in order to recover additional thermal energy from the reactor effluent. Further, a gaseous stream containing at least 95 volume percent nitrogen can then be indirectly heated by the reactor effluent by directing the nitrogen containing stream to one portion of the heat exchange device and the reactor effluent to a second portion of the heat exchange device. Heat is thus transferred the from the process stream containing energy which is the effluent from the carbon black reactor to the gaseous stream containing at least 95 volume percent nitrogen. Through this transfer of heat, energy is recovered from the reaction effluent stream, and the temperature of that stream is reduced and the reaction is effectively quenched and cooled prior to separation of carbon black from the reactor effluent.

In another embodiment of this invention, a gaseous stream containing at least 95 volume percent nitrogen (dry gas basis) is used as a purge gas for a drying chamber. Pellets of carbon black containing a liquid pelleting agent can be fed to a drying chamber. The wet pellets of carbon black can be heated within the drying chamber as the drying chamber is heated by heating a medium. The pellets of carbon black can be exposed to a purge stream containing at least 95 volume percent nitrogen and 5 volume percent oxygen or less. A gaseous stream containing at least 98 volume percent nitrogen and 2 volume percent or less oxygen is preferably used as a purge gas. The purge gas having a low oxygen content can sweep through the drying chamber and aid in the vaporization of a portion of the pelleting agent from the pellets without substantially oxidizing the carbon black in the drying chamber.

In one variation of this embodiment, the gaseous stream containing 95 volume percent nitrogen which is used as a purge gas is heated to a temperature in the range of about 800° F. to about 1800° F. prior to exposing the pellets of carbon black to it. The gaseous stream containing at least 95 volume percent nitrogen is preferably heated by waste heat from the manufacture of carbon black. For example, energy can be transferred to the gaseous stream containing 95 volume percent or more nitrogen which is used as a purge gas from process streams containing energy found in carbon black manufacture such as a reactor effluent stream, a effluent from a separation zone, and an effluent heating medium from a drying chamber.

In another variation of this embodiment, a gaseous stream containing at least 95 volume percent nitrogen is obtained from an air separation unit. The oxygen from the air separation unit can be used in a combustion step which forms hot combustion gases. The nitrogen can thus be a heretofore waste nitrogen stream.

In still another variation of this embodiment, the gaseous stream containing at least 95 volume percent nitrogen is admixed with a gaseous heating medium that is the effluent from a drying chamber. A gaseous heating medium for a drying chamber can be obtained from the combustion of a fuel with a free oxygen containing gas. Typically, such combustion can be oxygen rich and can contain stoichiometrically more oxygen than is necessary. If such heating medium effluent is used undiluted as a dryer purge gas, an excessive amount of oxygen may be present in the drying chamber. A relatively high oxygen level in the drying chamber e.g. above about 5% by volume oxygen (dry gas basis) can cause oxidation of the carbon black pellets and the formation of undesired, acidic compounds. By admixing the heating medium effluent stream with a gaseous stream containing at least 95% nitrogen, the concentration of oxygen inside the drying chamber can be reduced to less than about 5 volume percent oxygen based on total volume of gas within the drying chamber (on a dry gas basis). Preferably, the oxygen content inside the drying chamber is less than 2 volume percent of total oxygen based on total volume of gas within the drying chamber.

In another embodiment of this invention, a process suitable for producing two different types of carbon black utilizes a nitrogen-enriched gaseous stream. Air can be fed to an air separation means, such as an air fractionation unit, to form a first gaseous stream comprising at least 95 volume percent nitrogen and a second gaseous stream comprising at least 50 volume percent free oxygen. At least a portion of the first gaseous stream comprising at least 50 volume percent free oxygen can be fed to a first carbon black reactor. A feedstock such as a feed oil can be fed to the first carbon black reactor. At least a portion of the feedstock fed to the first carbon black reactor can be combusted in the presence of the gaseous stream containing at least 50 volume percent oxygen to form a hot combustion gas. Also, at least a portion of the feedstock fed to the first carbon black reactor can be decomposed in the presence of a hot combustion gas under conditions of temperature and pressure conducive to the formation of carbon black to form carbon black in the first carbon black reactor. The effluent from the first carbon black reactor comprising carbon black and a residual reaction gas can be directed to a first carbon black separation means, such as a filtration chamber. In the first carbon black separation means at least a portion of the carbon black formed in the first carbon black reactor is separated from a residual reaction gas of the first carbon black reactor. The carbon black formed in the first carbon black reactor and separated from the residual reaction gas of the first carbon black reactor can be recovered. Recovery is preferably accomplished by first pelleting the carbon black so formed with a pelleting agent such as water and removing excess pelleting agent in a drying chamber wherein the first gaseous stream comprising at least 95 percent nitrogen is present as a purge gas. At least a portion of the residual reaction gas from the first carbon black reactor can then be fed to a second carbon black reactor as a fuel gas. The residual reaction gas from the first carbon black reactor can contain organic compounds which lend the residual gas a fuel value sufficient for use as a fuel gas in the second carbon black reactor. Also, a portion of the gaseous stream comprising at least 50 volume percent oxygen can be fed to the second carbon black reactor in addition to a feedstock which is fed to the reactor. At least a portion of the residual reaction gas from the first carbon black reactor can be combusted in the presence of at least a portion of the gaseous stream comprising 50 volume percent oxygen to form a hot combustion gas. Furthermore, at least a portion of the feedstock fed to the second carbon black reactor can be combusted in the presence of at least a portion of the gaseous stream comprising at least 50 volume percent oxygen to form a hot combustion gas. Thus, at least a portion of the feedstock fed to the second carbon black reactor can be decomposed in the presence of a hot combustion gas obtained from the combustion of the residual reaction gas from the first carbon black reactor and the combustion of at least a portion of the feedstock. The decomposition of a portion of the feedstock can be at conditions conducive to the formation of carbon black to form carbon black in the second carbon black reactor. The effluent from the second carbon black reactor comprising carbon black and residual reaction gas can be directed to a second carbon black separation means wherein at least a portion of the carbon black formed in the second carbon black reactor can be separated from the residual reaction gas of the second carbon black reactor. Carbon black formed in the second carbon black reactor can be recovered. Preferably recovery of the carbon black is by pelleting the carbon black with a pelleting agent such as water and removing excess pelleting agent in a drying chamber utilizing the gaseous stream containing at least 95 volume percent nitrogen as a purge gas.

The first carbon black reactor can be a tangential carbon black reactor wherein the feedstock is fed to the reactor axially and a hot combustion gas contacts the feedstock tangentially. Preferably the first carbon black reactor is an axial carbon black reactor wherein the feedstock is fed to the reactor axially and at least a portion of the hot combustion gas contacts the feedstock coaxially. The second carbon black reactor can be an axial carbon black reactor. Preferably the second carbon black reactor is a tangential carbon black reactor. The feedstock fed to the first carbon black reactor and the feedstock fed to the second carbon black reactor can be the same or different types of feedstock; that is, the feedstock to the first carbon black reactor can differ from the feedstock fed to the second carbon black reactor in composition, degree of aromaticity, level of contaminants, etc. The feedstock to the first or second carbon black reactor can comprise a carbon containing gas, a petroleum oil, a liquefied or gaseous oil shale product, a liquefied or gaseous coal product. The feedstock can contain sulfur and/or a hydrocarbon.

In one variation of this embodiment, the combustion of at least a portion of the feedstock fed to either the first or the second carbon black reactor occurs in the presence of a gaseous stream comprising at least 50 volume percent oxygen and an alternate fuel. The alternate fuel can be selected from a group consisting of a methane-containing gas, a light hydrocarbon such as ethane, propane, and the like, a petroleum oil, and a product of a solid fuel such as coal or oil shale. Also, the gaseous stream comprising at least 50 volume percent oxygen can be admixed with a diluent such as a free oxygen containing gas like air prior to feeding said gaseous stream to a carbon black reactor.

In another variation of this embodiment, one carbon black reactor is operated under conditions conducive to the formation of soft carbon black and the second carbon black reactor is operated under conditions conducive to the formation of hard carbon black. The term "hard carbon black" as used in the specification and claims is defined as N 300 series, N 200 series, and N 100 series (ASTM D 1765-76). Typical hard blacks are N 339, N 330, N 220, N 110 and the like. Hard carbon blacks typically have module sizes in the range of about 10 to 30 m$\mu$. The term "soft carbon black" as used in the specification and claims is defined as N 500 series, N 600 series, N 700 series, N 800 series, and N 900 series (ASTM D-1765-76). Typical soft blacks are N 550, N 765, N 990 and the like. Soft carbon blacks typically have module sizes in the range of about 40 to 500 m$\mu$.

Soft carbon black can be produced by feeding to a carbon black reactor a relatively low ratio of oxygen to feedstock. Preferably, the ratio of oxygen to feedstock for soft carbon black is in the range of about 350 to 550 standard cubic feet of equivalent air (e.g. about 20.9 volume percent oxygen based on total volume of feed gaseous stream) per one gallon of feed stock. Typical soft carbon black processes and apparatus are disclosed in U.S. Pat. No. 3,560,164; U.S. Pat. No. 3,409,406; and U.S. Pat. No. 2,375,795, and others.

Hard carbon black can be produced by feeding to a carbon black reactor a relatively high ratio of oxygen to feedstock. Preferably, the ratio of oxygen to feedstock for hard carbon black is in the range of about 450 to 700 standard cubic feet of equivalent air per one gallon of feedstock. Typical hard carbon black processes and apparatus are disclosed in U.S. Pat. No. 3,567,700 and U.S. Pat. No. 3,362,790 and others.

Various carbonaceous feedstocks are employed in the manufacture of soft and hard carbon black. Preferably, the feedstocks are heterosubstituted organics or hydrocarbons such as heavy hydrocarbons having a Bureau of Mines Correlation Index (BMCI) of about 85 to about 150 and having 50 percent boiling points of about 650° F. to about 950° F.

In another variation of this embodiment, at least a portion of the residual reaction gas from the first and/or the second the second carbon black reactor are admixed with a free oxygen containing gas such as air and are combusted to form a heating medium. The heating medium so formed can be used to heat a drying means such as a drying chamber. The heating medium so formed can also be used to heat a heat exchange device such as a boiler wherein water or other volatilizable material is converted to a gaseous form for later heat exchange duty.

In another variation of this embodiment, the residual reaction gas from the first and/or second carbon black reactor comprises sulfur and is directed to a sulfur recovery means. The feedstock to a carbon black reactor can contain sulfur and hydrocarbon, a portion of which can be present in residual reaction gas. It is thus desirable to recover the sulfur from the residual reaction gas prior to releasing the reaction gas to further use or to the atmosphere. The term sulfur as used in the specification and claims includes elemental sulfur and sulfur-containing compounds such as a sulfur-heterosubstituted organic compound. The sulfur recovery means utilized in this invention can be a conventional sulfur recovery means such as a sulfur removal device and a sulfur converter such as those found in a Claus sulfur unit. In the sulfur removal means, at least a portion of sulfur is removed from the residual reaction gas to form a residual reaction gas having a reduced sulfur content. The residual reaction gas having a reduced sulfur content can be used as fuel for means to remove excess pelleting agent from pellets of carbon black such as a dryer.

In another variation of this embodiment, various process streams are preheated and/or used to recover energy from other process streams containing energy found in the manufacture of carbon black. One or more heat exchange devices can be positioned in contact with one or more process streams containing energy such as the effluent from a carbon black reactor, residual reaction gas from a separation means, a heating medium effluent from a drying means, etc. and one or more process streams to be pre-heated. For instance, a gaseous stream containing oxygen which is fed to a carbon black reactor for the purposes of combusting a fuel to form a hot combustion gas can be passed in contact with a heat exchange device which is heated by a process stream containing energy. Also, a feedstock to a carbon black reactor can be passed in contact with a heat exchange device which is heated by a process stream containing energy. Furthermore, a fuel stream to be utilized as a fuel for the combustion used to form a hot combustion gas can be passed in contact with a heat exchange device and can be preheated. Likewise, a gaseous stream containing nitrogen can be passed in contact with and be heated by a heat exchange device which is heated by a process stream containing energy. These various carbon black process streams can thus be preheated prior to their injection into the various process vessels. Preferably, the residual reaction gas stream from a first carbon black reactor which is fed to a second carbon black reactor as a fuel gas is preheated in such manner prior to its use as a fuel gas for the second carbon black reactor.

In another variation of this embodiment, a process stream found in a first carbon black reaction, separation, and recovery train or chain of process steps can be used to recover energy from a process stream containing energy found in a second carbon black reaction, separation, and recovery train or chain of process steps. For instance, the residual reaction gas from a first carbon black reactor which is used as a feed to a second carbon black reactor as a fuel gas can be preheated by passing the gas in contact with the effluent from the first and/or second carbon black reactor. Furthermore, a feedstock feedstream or a free oxygen containing-gas feedstream to a first carbon black reactor system can be passed in contact with a heat exchange device that contacts a process stream containing energy found in the manufacture of carbon black in a second carbon black reaction, separation, and recovery train to transfer energy from the second to the first reactor system.

In another embodiment of this invention, a process for the manufacture of sulfur is provided. A sulfur- and hydrocarbon-containing material can be decomposed at a temperature in excess of 2000° F. to form a sulfur-containing gaseous stream. The sulfur-containing gaseous stream can be cooled to a temperature in the range of about 500° F. to 2000° F. Then, the sulfur-containing gaseous stream can be passed to a sulfur removal means to remove at least a portion of the sulfur from the sulfur-containing gas. Preferably, the sulfur-containing material is decomposed by combusting at least a portion of said sulfur-containing material in the presence of a gas comprising at least 50 volume percent oxygen. Furthermore, the sulfur-containing gas so decomposed at a temperature in excess of 2000° F. is preferably cooled prior to recovery of the sulfur from the gas by admixing the sulfur-containing gas with a second gaseous stream containing sulfur having a temperature at or below 1000° F.

The sulfur- and hydrocarbon-containing material can be selected from the group consisting of a carbon-containing gas, a petroleum oil, a shale oil, and a coal. Preferably, said sulfur- and hydrocarbon-containing material is a residual reaction gas from a carbon black reactor which has a petroleum oil feedstock comprising sulfur.

In another embodiment of this invention, a gaseous stream containing at least about 95 volume percent nitrogen is used to provide positive pressure on seals used on equipment in carbon black manufacture. Seals such as mechanical seals and packing glands are used to reduce the flow of fine particles of carbon black from equipment joints. Joint and spaces are typically found between moving parts and stationery parts. For example, when a rotary dryer is used a drying chamber for removing a pelleting agent from pellets of carbon black, the shell of the dryer rotates. A stationary feed conduit typically feeds pellets of carbon black containing a pelleting agent to the rotary dryer. A space or joint is formed between the stationary feed conduit and the rotating feed section of the rotary dryer. Since a purge gas under a positive pressure can generally flows through the rotary dryer, fine particles of carbon black can be blown through and out of unprotected joints or spaces into the atmosphere. Seals are used on such equipment to reduce the escape of the fine particles of carbon black to the atmosphere.

In one variation of this embodiment, a gaseous stream containing at least 95 volume percent nitrogen (dry gas basis) is used to prevent the escape of particles of carbon black to the environment from equipment seals. A positive pressure of the gaseous stream containing at least 95 volume percent nitrogen can be maintained at joints or spaces. The pressure of the gaseous stream containing at least 95 volume percent nitrogen should be greater than the pressure of the gases inside the equipment, such as the shell of drying chamber. The gaseous stream containing nitrogen can thus provide a blanket which provides a flow of nitrogen containing gas into the equipment. This prevents a flow of a gaseous stream containing particles of carbon black from the equipment to the environment.

In still another embodiment of this invention, the temperature of a gaseous stream such as a purge gas added to a drying chamber is controlled. The drying chamber can be a drying chamber suitable for removing a pelleting agent from pellets of carbon black. A process stream containing energy can be passed through one portion of a heat exchange device such a shell and tube heat exchanger. A gaseous stream containing at least 95 volume percent nitrogen (dry gas basis) can be passed through a second portion of a heat exchange device. Heat is thus transferred from the process stream containing energy to the gaseous stream containing nitrogen.

In one variation of this embodiment, the amount of the process stream containing energy that passes through the heat exchange device is controlled. A conduit which provides a by-pass means around the heat exchange device can be used to direct a portion of the flow of the process stream containing energy around the heat exchange device. In this manner, the amount of the process stream containing energy which contacts the heat exchange device and transfers energy to the gaseous stream containing nitrogen is reduced.

In another variation of this embodiment, the amount of the gaseous stream containing nitrogen that is passed in contact with or through the heat exchange device is controlled. In a preferred variation, the temperature of the gaseous stream which will enter the drying chamber is measured. A temperature signal representative of the temperature measured can be directed to a control means having an output. Control means can be a relay logic unit or a digital logic unit or can be a conventional analog controller having proportional-, integral-, and-/or derivative-control modes. The output of the control means can be directed to a first control device such as an automatic control valve located on a by-pass conduit around the heat exchange device. The by-pass conduit around the heat exchange device can direct a portion of the gaseous stream containing nitrogen around the heat exchange device. In this manner, when the control device located on the by-pass conduit is partially opened, only a portion of the gaseous stream containing nitrogen is directed through the heat exchange device. When the control device is closed and the by-pass conduit is thus blocked, all of the gaseous flow containing nitrogen passes through the heat exchange device. A measuring means located downstream from the heat exchange device can sense the temperature of the gaseous stream which will enter the drying chamber and can transmit the measured temperature to the control means. The control means can direct a control device located in the by-pass conduit around the heat exchange device to regulate the rate of flow of the gaseous stream containing nitrogen through the heat exchange device. In one variation, the control device is a conventional three-way control valve located in the by-pass conduit. One port of the valve can be a feed flow of the gaseous stream containing at least 95 volume percent nitrogen. A second port of the control valve can be an outlet port which directs the gaseous flow containing nitrogen to a heat exchange device. A third port of the three-way control valve can be an outlet port which directs the flow of the gaseous stream containing nitrogen around the heat exchange device through the by-pass conduit. In a preferred variation, the control device is a two-control valve configuration having one control valve located in the by-pass conduit around the heat exchange device. A second control valve is located in the feed conduit to the heat exchange device. The control means can have two outputs. One output can be directed to the control valve located in the by-pass conduit. The second output can be directed to the control valve which is located in the feed conduit for the heat exchange device. The relative position of both valves determines the amount of the gaseous stream containing nitrogen which by-passes the heat exchange device and the amount of the gaseous stream containing nitrogen which passes through the heat exchange device.

In another embodiment of this invention, the oxygen content of a gaseous stream which will enter a drying chamber is controlled. The oxygen content of a gaseous stream which will enter a dryer can be controlled by admixing the stream with a gaseous stream containing at least 95 volume percent nitrogen on dry gas basis. In this manner, a stream containing oxygen can be diluted with a stream containing nitrogen. The oxygen content of a gaseous stream which will enter the drying chamber can be lowered by admixing the stream with a nitrogen enriched gas.

In one variation of this embodiment, a portion and/or all of the effluent heating medium from a drying chamber heat duty is admixed with a nitrogen enriched gas. A drying chamber can be heated with a gaseous heating medium such as a gaseous heating medium derived from the combustion of a fuel with a free oxygen containing gas such as air. The combustion of the fuel can occur in an oxygen enriched environment such that the heating medium effluent contains free oxygen. If the heating medium effluent is to be utilized as a drying chamber purge gas, then the oxygen content should be reduced to a suitable level. In this variation, the amount of a nitrogen containing gas that is admixed with the drying chamber effluent is controlled in such a manner that the oxygen concentration inside the drying chamber is controlled.

In a specific variation of this embodiment, the oxygen concentration of a gaseous stream which will enter the drying chamber is measured by an oxygen measuring means. The oxygen measuring means can be a conventional oxygen analyzer utilizing an oxygen measurement cell or can be a gas chromatograph. The oxygen measuring means senses the oxygen concentration of the gaseous stream which will enter the drying chamber. The oxygen measuring means transmits the oxygen concentration measurement to a control means having an output. The output of the control means can be directed to a control device such as an automatic control valve. The control device can adjust the amount of nitrogen enriched gas which is admixed with the process stream containing oxygen. By increasing the amount of the gaseous stream containing nitrogen that is admixed with the purge gas stream, the amount of oxygen concentration of the purge gas stream which will enter the drying chamber reduced. Thus, the oxygen concentration inside the drying chamber can be controlled by controlling the addition of nitrogen to the gaseous stream which will enter the drying chamber.

In one variation of this embodiment, the control device is an automatic three-way valve. One port of the automatic three-way valve can be a feed port wherein the process stream containing oxygen is fed to the valve. A second port of the three-way valve can be a feed port in which a gaseous stream containing nitrogen is fed to the valve. The third port of the three-way valve can be an outlet port wherein the mixture of the gaseous stream containing nitrogen and the process stream containing oxygen exits from the three-way valve. The oxygen measuring means can transmit the oxygen measurement to the control means. The control means in turn can direct the three-way valve to assume a position which will regulate the percentage of relative flow of the nitrogen enriched stream and the percentage of flow of the process stream containing oxygen in such a manner that the concentration of the oxygen downstream of the exit port of the three-way valve is at a desired level.

In another variation of this embodiment, the control device can be a two-control valve configuration wherein a first valve is located on a conduit containing a nitrogen enriched gas. A second control valve is located on a conduit containing a process stream containing oxygen. The control means can have two outputs. One output can be directed to the control valve regulating the flow of the gaseous stream containing nitrogen. The second output from the control means can be directed to the valve which controls the flow of the process stream containing oxygen that is admixed with the flow of the nitrogen enriched stream. The output from the control means can adjust the relative portion of both valves and determine the amount of the gaseous stream containing nitrogen that is admixed with the oxygen containing stream.

The following description contains further preferred embodiments of this invention but should not be read in an unduly limiting manner.

Figure 1:
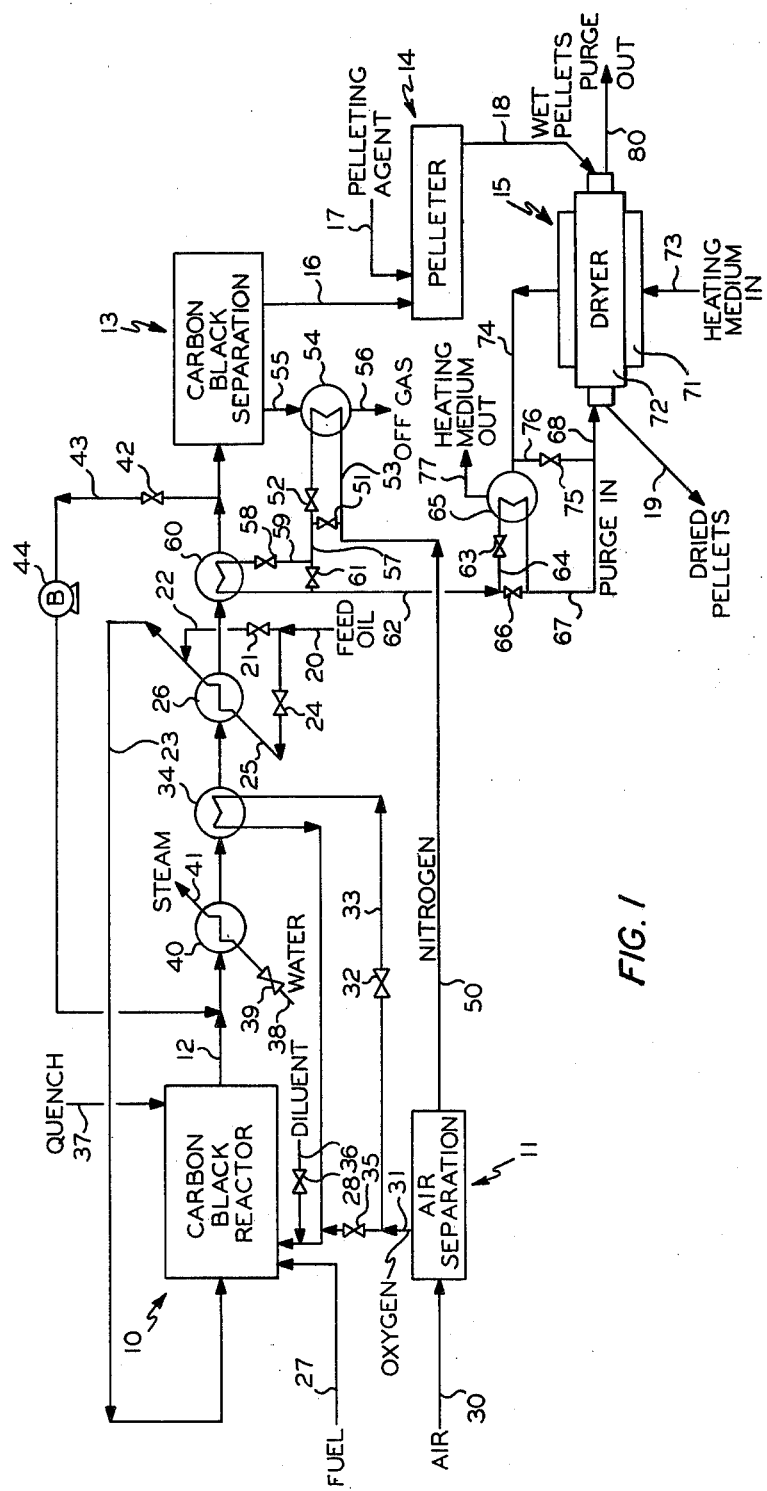

FIG. 1 shows a nitrogen enriched stream utilized in the recovery of energy from process streams containing energy in the manufacture of carbon black. The effluent from a carbon black reactor 10 containing particles of carbon black admixed with reaction off gases is directed by a conduit 12 to a carbon black separation system 13. In the carbon black separation unit, 13 which can be a filtration system, particles of carbon black are separated from the gaseous stream containing those particles. Particles of carbon black in conduit 16 are directed to a pelleter 14 where the carbon black is admixed with a liquid pelleting agent from conduit 17. Pellets containing the pelleting agent are directed by conduit 18 from the pelletizer 14 to a drying chamber 15. Pellets containing a reduced concentration of pelleting agent are directed from the drying chamber via conduit 19 and are recovered as carbon black product.

Indirect heat exchange devices 40, 34, 26, an 60 are located in the exit conduit 12 from the carbon black reactor 10. These heat exchange devices are used alternatively or in conjunction with each other to recover energy effluent from the carbon black reactor 10.

Feed oil enters the system via conduit 20. If valve 21 is open and valve 24 is closed, then a flow of feed oil can be directed around and can by-pass via conduit 22 the heat exchange device 26. When heat exchange device 26 is not in use, feed oil flows via conduit 20 through open valve 21 and through conduits 22 and 23 to the carbon black reactor 10. When valve 21 is closed and valve 24 is open, feed oil flows to the carbon black reactor through heat exchange device 26. When heat exchange device 26 is in use, feed oil flows via conduit 20 through open valve 24 and through conduit 25 through heat exchange device 26. The effluent from heat exchange device 26 is directed through conduit 23 into the carbon black reactor 10. When the heat oil flows in contact with heat exchange device 26, energy can be transferred thereto from the effluent in conduit 12 from the carbon black reactor 10. Hot combustion gases used in the carbon black reactor 10 can be derived from the combustion of a fuel in conduit 27 and a free oxygen containing gas in conduit 28. The free oxygen containing gas in conduit 28 can be derived from a conventional air separation unit 11. Air in conduit 30 can feed the air separation unit 11 and produce oxygen in conduit 31. If valve 32 is closed and valve 35 is open, oxygen is directed to conduit 28 and into the reactor. Alternatively, a diluent such as air in conduit 36 can be admixed with the oxygen in conduit 28 to achieve desired carbon black reaction conditions. If valve 35 is closed and valve 32 is open, then oxygen is directed via conduit 33 to a heat exchange device 34. Thus, the effluent from the carbon black reactor 10 in conduit 12 which contacts the heat exchange device 34 can transfer energy to the oxygen feed which passes through heat exchange device 34 and subsequently into the reactor via conduit 28.

A reaction in the carbon black reactor 10 can be partially quenched via a quench stream in conduit 37 to a temperature suitable for passing the partially quenched stream via conduit 12 to a heat exchange device 40. If valve 39 is open, water or other suitable heat exchange medium can pass via conduit 38 in contact with heat exchange device 40. The heat exchange medium such as water exits in a suitable form such as steam via conduit 41. The effluent from the carbon black reactor 10 in conduit 12 can thus be partially or totally quenched and reduced in temperature via heat exchange device 40 which can recover energy from said stream. It is understood by those skilled in the art that heat exchange devices 40, 34, 26, and 60 can be used alternatively or can be used in combination with one or more of the other heat exchange devices.

Nitrogen in conduit 50 from the air separation unit 11 can be directed to several heat exchange devices which also can be used alternatively or in combination. If valve 51 is closed and valve 52 is open, then the nitrogen enriched gas passes via conduit 53 through heat exchange device 54. Off gases from the carbon black separation unit 13, which can be a relatively low BTU fuel gas exit the separation unit via conduit 55 and pass in contact with heat exchange device 54 and exits the system via conduit 56. The effluent from the carbon black separation unit can transfer energy to the nitrogen enriched gas which passes in contact with the heat exchange device 54. If valve 52 is closed and valve 51 is open, then heat exchange device 54 is by-passed and no heat energy is transferred from the carbon black separation effluent to the nitrogen enriched gas.

If valve 61 is closed and valve 58 is open, nitrogen enriched gas in conduit 57 is directed via conduit 59 to heat exchange device 60. Effluent from the carbon black reactor 10 and conduit 12 passes in contact with heat exchange device 60. Thus, energy can be transferred from the carbon black reactor effluent to the nitrogen enriched gas which passes in contact with heat exchange device 60. If valve 61 is open and valve 58 is closed, the nitrogen enriched gas in conduit 57 by-passes the heat exchange device 60.

The drying chamber 15 has a rotating drum or shell 72 which contains pellets containing a liquid pelleting agent to be removed therefrom. A furnace chamber 71 substantially surrounds the shell 72 of the drying chamber numer 15. A heating medium in conduit 73 flows into the furnace chamber 71. The heating medium heats the outer periphery of the shell 72 of the drying chamber 15 and then exit from the furnace chamber 71 via conduit 74. When valve 75 is completely closed, the heating medium effluent in conduit 74 passes in contact with indirect heat exchange device 65 and exits the system via conduit 77. When the nitrogen enriched stream in conduits 62 and 64 passes in contact with the heat exchange device 65, heat is transferred from the used heating medium effluent from dryer 15 to the nitrogen enriched gas stream. If valve 63 is open and valve 66 is closed, then the nitrogen enriched gas in conduit 62 passes in contact with heat exchange device 65. If valve 63 is closed and valve 66 is open, then the nitrogen enriched stream by-passes the heat exchange device 65.

It is understood by those skilled in the art that valves regulating the amount of flow to heat exchange devices such as valves 32, 24, 58, 53, and 63 need not be completely opened nor completely closed but can be throttled to regulate the proportion of nitrogen enriched flow which passes through the heat exchange device. It is also understood that by-pass valves such as valves 35, 21, 61, 51, and 66 can be throttled to regulate the amount of nitrogen enriched gaseous flow which by-passes the heat exchange devices.

A purge gas in conduit 67 can enter the drying chamber 15 via conduit 68 and can exit via conduit 80. If valve 75 is completely closed, the purge gas in conduit 68 can consist essentially of a nitrogen enriched gaseous stream derived from conduit 67 and vaporized pelleting agent. If valves 66 and 63 are closed, and valve 75 is open, the purge gas in conduit 68 can consist essentially of the heating medium effluent in conduit 74, even though it is not preferred to so operate since the heating medium effluent typically contains substantial free oxygen. The position of valve 75 and valves 66 and 63 can be adjusted to control the ratio of heating medium effluent 74 that is admixed via conduit 76 with the nitrogen enriched stream in conduit 67 which is utilized as a purge gas.

Figure 2:
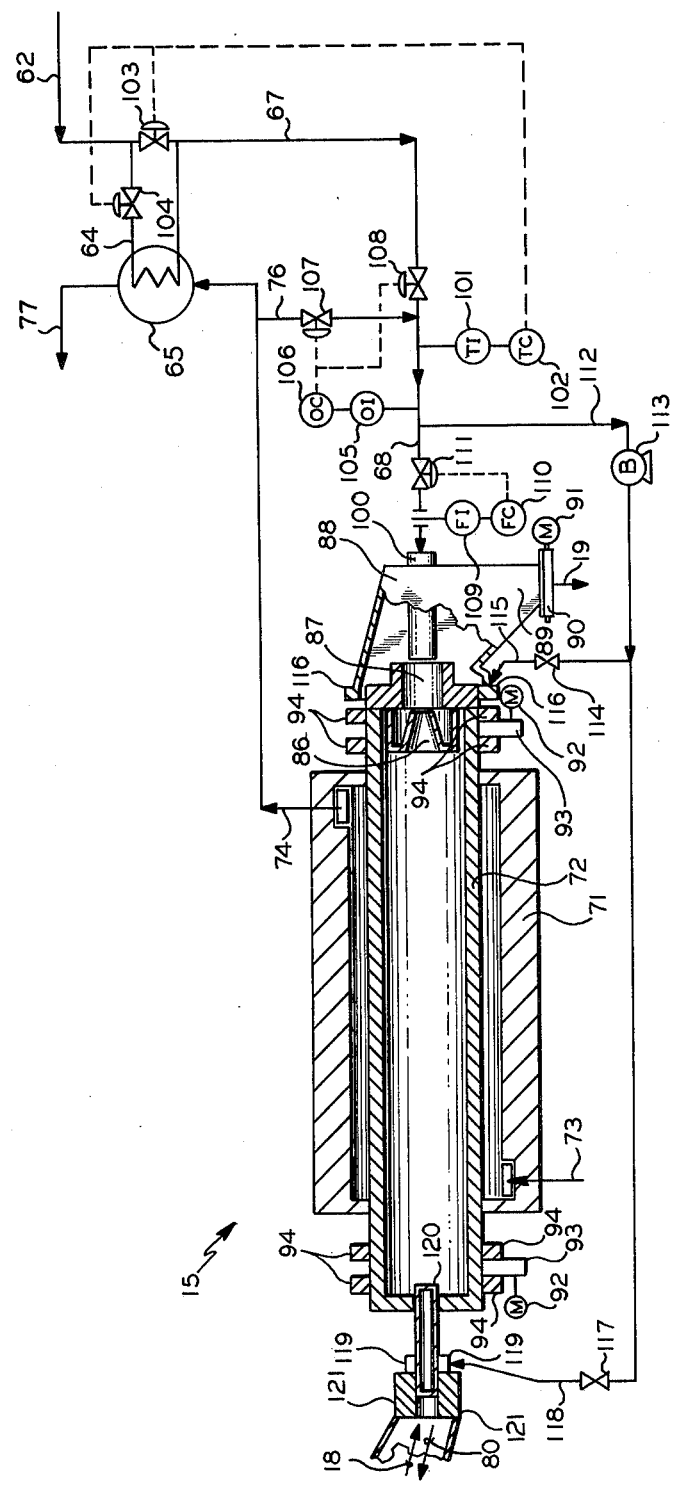
FIG. 2 shows a control system for controlling the oxygen content and temperature of a drying chamber purge gas.

FIG. 2 shows control system used to control the oxygen content of and/or temperature of a gaseous stream entering a drying chamber. FIG. 2 also shows seals having a nitrogen enriched purge gas. The drying chamber 15 has a furnace chamber 71 and a rotating shell or drum 72. A heating medium enters via conduit 73 contacts the outer surface of the shell of the dryer 72 and exits via conduit 74. The heating medium in conduit 74 contains substantial energy. The heating medium in conduit 74 can be directed in contact with the heat exchange device 65 and can exit the system via conduit 77. A nitrogen enriched gas in conduit 62 can be directed via conduit 67 and 68 into the drying chamber 15 via a feed nozzle 100. If valve 104 is open and valve 103 is closed, then all of the nitrogen enriched gas in conduit 62 is directed through conduit 64 and in contact with heat exchange device 65. Energy can be transferred from the heating medium effluent stream in conduit 74 via the indirect heat exchange device 65 to the nitrogen enriched gaseous stream in conduit 64. If valve 104 is closed and valve 103 is open, the nitrogen enriched stream in conduit 62 by-passes the heat exchange device 65.

In a preferred embodiment, temperature sensor 101 measures the temperature of the gas in conduit 68 and directs the temperature measurement to temperature control means 102. The output from the temperature control means 102 can be directed to valves 103 and 104. If the temperature in the conduit 68 is low, then the control means 102 directs that control valve 103 be partially or completely closed. The control means also directs that valve 104 be partially or completely open. A flow of a nitrogen enriched stream which passes in contact with heat exchange device 65 is then increased and the resultant temperature of the stream in conduit 68 is increased. If temperature indicator 101 senses that the temperature in conduit 68 is high, then the output from the control means 102 directs that control valve 104 be partially or completely closed and control valve 103 be partially or completely open. The amount of the nitrogen enriched stream which by-passes the heat exchange device 65 is thus increased and the temperature in conduit 68 is decreased.

The oxygen analyzing means 105 can sense the concentration of oxygen in conduit 68. If the oxygen analyzing means 105 senses that the oxygen concentration in conduit 68 is high, then the output from the control means 106 directs that valve 107 in conduit 76 be partially or completely closed and valve 108 in conduit 67 be partially or completely open. If the oxygen analyzing means 105 senses that the oxygen concentration in conduit 68 is low, then the output from control means 106 can direct that valve 108 be partially or completely closed and valve 107 be partially or completely open. Generally, valve 108 is preferably not completely closed. In this manner, the amount of heating medium effluent in conduit 74 and 76 that is admixed with the nitrogen enriched gaseous stream in conduit 67 can be controlled to control the resultant mixture in conduit 68.

Flow indicator 109 in conduit 68 can measure the flow of the gaseous stream entering the drying chamber 15. Measurement from the flow measuring means 109 is directed to a flow control means 110. The flow control means 110 then manipulates valve 111 in conduit 68 to either increase or decrease the total flow of gaseous stream which enters the drying chamber 15.

The above description should not be read in an unduly limiting manner. Those skilled in the art, for example, will realize that a reaction off gas stream from the carbon black reactor effluent or from the carbon black separation system effluent can be utilized to control the temperature and oxygen content of a gaseous stream entering the drying chamber in lieu of heating medium effluent from the drying chamber.

Also in FIG. 2, a power source or sources 92 imparts movement to a drive means 93 which turns the shell 72 of the drying chamber 15. Guides 94 support and guide the movement of the drying chamber shell. Pellets of wet carbon black 18 containing substantial or excess pelleting agent enter the drying chamber 15 shell via a feed tube 120. The used purge gas 80 can exit the shell 72 of the drying chamber 15 via the feed tube 120. The dried pellets of the carbon black are picked up by lifting means 86 and are directed to a stationery hood 88 via an exit conduit 87. The pellets are held within an exit zone 89 and are directed from the drying chamber 15 by suitable valve 90 such as a star valve which is driven by a power source 91. Pellets which exit the drying system via conduit 19 are recovered as carbon black product.

The feed tube 120 which is integral to the drying shell 72 rotates as the dryer shell rotates. The feed tube communicates with the inlet conduit 121 to the pelleter via seals 119. A gaseous stream containing nitrogen in conduit 112 passes through a blower 113 and through opened valve 117 in conduit 118 to the seals. The nitrogen containing gases are used to provide a positive pressure to the seals to prevent the escape of particles of carbon black. The exit hood 88 communicates with the outer surface of the dryer shell 72 via seals 116. The seals prevent the escape of particles of carbon black from the shell 72 of the drying system. A nitrogen enriched gas via conduit 112 can pass through a blower 113 via opened valve 114 and conduit 115 to the seals 116. Thus a nitrogen enriched gas can provide a positive pressure on the seals and prevent the escape of particles of carbon black from the stationary hood 88 of the drying chamber 15.

FIG. 3 shows an enlarged view of the dryer feed section. The feed tube 120 can be integral to or can be affixed rigidly to the shell 72 of the drying chamber. As the shell of the drying chamber 72 rotates, the feed tube 120 also revolves. The pellet feed conduit 121 is stationary. Affixed to the feed conduit 121 are seals 119. The seals 119 prevent the escape of particles of carbon black to the environment. Wet pellets of carbon black flow in the direction of arrow 18 toward the shell of the dryer 72. Used purge gas can flow in the direction of arrow 80 from the shell of the dryer 72.

The seal 119 comprises a base unit 149. The base unit 149 preferably has various channels 161 and 162 cut within it. Channels such as channel 162 generally can be formed by the space or void or absence of solid material between a stationary surface and a moving surface. Located within each channel can be various sealing components 163. These sealing components contact the outer periphery of the rotating feed tube 120. These sealing components are typically made of a suitable compound such as graphite. The sealing components 163 are forced against the rotating feed tube 120 by springs 164. The tension in the springs 164 against the sealing component 163 and the feed tube 120 is controlled by an adjusting means 165 such as a screw or a bolt. A nitrogen enriched gas is passed in the direction of arrows 160 into channels cut within the sealed base unit 149. Thus, nitrogen is forced into the seal 119 and toward the feed tube 120.

The seal system 119 also comprises a packing gland shown generally as 148. Packing 151 is contained within a retaining bracket 147. A packing guide 152 forces packing 151 toward the feed tube 120 by means of a guide means 153 such as a screw or a bolt. Nitrogen enriched gas 150 enters the packing gland 147 via an opening 155. Thus, nitrogen enriched gas provides a positive pressure on the seal to prevent the escape of particles of carbon black from the seal into the atmosphere.

Figure 4B:
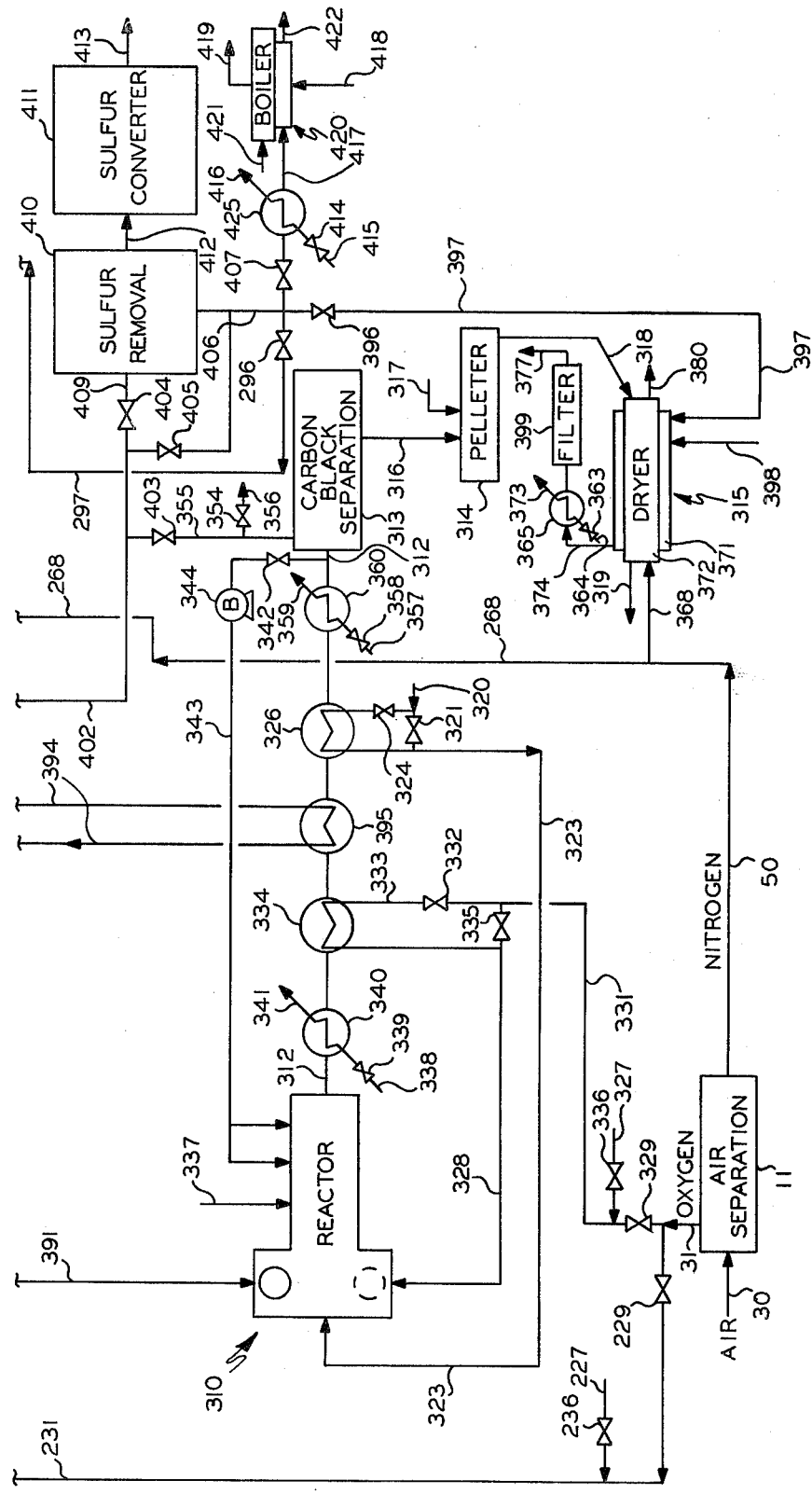

FIG. 4 shows a plant suitable for producing two different types of carbon black products, utilizing a nitrogen-enriched gaseous stream. The effluent from a first carbon black reactor 210 passes via a conduit 212 to a first carbon black separation means 213. In the first carbon black separation means 213, particles of carbon black are separated from a residual reaction gas from the first carbon black reactor 210. Particles of carbon black from the first separation means 213 passes via conduit numeral 216 to a first pelleting means 214. A pelleting agent such as water is added via conduit 217 to the first pelleter 214. Pellets of carbon black pass via conduit 218 to a drying chamber 215 or other similar means for removing excess pelleting agent from the pellets of carbon black. Pellets of carbon black having a reduced content of pelleting agent pass from the means for removing pelleting agents such as the drying chamber 215 via a conduit 219 and are recovered as product carbon black in pellet form.

The effluent from a second carbon black reactor 310 passes via a conduit 312 to a second carbon black separation means 313. In the second carbon black separation means 313, particles of carbon black formed in the second carbon black reactor are separated from the residual reaction gas from the second carbon black reactor 310. The particles of carbon black from the second separation means 313 pass via a conduit 316 to a second pelleter 314. A pelleting agent such as water is added via conduit 317 to the pelleter 314. Pellets of carbon black pass from the pelleter 314 via conduit 318 to a second drying means 315 or other means for removing pelleting agent from the pellets of carbon black. Pellets of carbon black having a reduced content of pelleting agent pass from the means for removing pelleting agent from the pellets 315 via conduit 319 and are recovered as product carbon black in pellet form.

Preferably the first reactor 210 is operated under conditions conducive to the formation of soft carbon black and the second carbon black reactor 310 is operated under conditions conducive to the formation of hard carbon black.

Heat exchange device 226 is positioned in contact with the effluent from the first carbon black reactor 210. Heat exchange device 226 can be used to preheat or transfer energy from the effluent from the first carbon black reactor 210 to the feedstock. If valve 224 is open and valve 221 is closed, then feedstock in conduit 220 passes through heat exchange device 226 and via conduit 225 and conduit 223 to the first reactor 210. Thermal energy from the effluent of the first carbon black reactor in conduit 212 can thus be transferred to the feedstock. If valve 224 is closed and valve 221 is open, then feedstock in conduit 220 bypasses heat exchange device 226 and passes via conduit 223 directly into the first carbon black reactor 210.

Air in conduit 30 enters an air separation means 11. The air separation means produces an oxygen-enriched stream in conduit 31 and a nitrogen-enriched stream in conduit 50. The oxygen-enriched stream in conduit 31 can be used to form a hot combustion gas in one or more of the carbon black reactors. The oxygen-enriched stream can be preheated prior to its injection into a carbon black reactor. The oxygen-enriched stream can be admixed with one or more diluents such as air, residual reaction gas, etc. prior to injecting the stream into a carbon black reactor. The oxygen-enriched stream can be used to combust a portion of the feedstock and/or an alternate fuel to form a hot combustion gas to cause the decomposition of the feedstock and to drive the carbon black formation reaction.

Thus, if valves 229, 235 and any of 284, 285 or 286 are open then the oxygen-enriched stream can pass via conduit 231 and 228 and any of conduits 289, 290, or 291 into the first carbon black reactor 210. Conduits 289, 290 and 291 provide multiple injection points for the oxygen-enriched stream into the first carbon black reactor 210. If a valve 282 is open, then a diluent such as air can be admixed with the oxygen-enriched stream and can pass via conduit 281 and conduit 291 into the carbon black reactor 210. If valve 283 is open, then a diluent can pass via conduit 281 and conduit 290 into the first carbon black reactor 210. Alternatively, valve 282 can be closed and valve 283 can be open or valve 283 can be closed and valve 282 can be open to adjust the amount of diluent added at various points to the first carbon black reactor 210. Thus, the concentration of oxygen in various zones of the first carbon black reactor can be controlled. If valve 287 is open, then a diluent in conduit 288 can be passed via conduit 289 into the first carbon black reactor 210. A diluent in conduit 288 can be the same or different from the diluent in conduit 281. For example, the diluent in conduit 288 can have a higher or a lower oxygen concentration than the diluent in conduit 281 in order to advantageously adjust or control the amount of oxygen present in various reaction zones.

An alternate fuel in conduit 292 such as a methane-containing gas, a low-grade fuel oil, etc. can be admixed as in a burner means with the oxygen-enriched gas feed to the first carbon black reactor 210 or can be added separately to the first reactor 210. The alternate fuel can be combusted in the presence of the oxygen-enriched gas to form at least a portion of the hot combustion gas which drives the carbon black formation reaction.

If valve 235 is closed and valve 232 is open, then the oxygen-enriched stream in conduit 231 passes via conduit 233 in contact with heat exchange device 234. Heat exchange device 234 is positioned in contact with the effluent from the first carbon black reactor in conduit 212. The oxygen-enriched gas can thus be preheated by heat exchange device 234 and energy can be recovered from the effluent of the first carbon black reactor 210 in conduit 212. If valve 236 is open, a diluent such as air in conduit 227 can be admixed with the oxygen-enriched gas in conduit 231. The mixture of diluent and oxygen-enriched gas can then pass to heat exchange device 234 to be preheated prior to introduction into carbon black reactor 210 or can be injected into carbon black reactor 210 without preheating.

Quench fluid such as water in conduit 237 can be injected into the first carbon black reactor 210 to cool the reaction effluent to control and/or terminate the reaction. The effluent from the reactor from conduit 212 can pass in contact with a heat exchange device 240. If valve 239 is open, a heat transfer fluid in conduit 238 passes in contact with heat exchange device 240 and exits heat exchange device 240 at an elevated temperature. Thermal energy from the reactor effluent in conduit 212 is thus transferred by heat exchange device 240 to the heat transfer medium in conduit 238. Simultaneously, the effluent from the reactor in conduit 212 is further cooled and/or quenched by means of the heat transfer medium in conduit 238 which passes through the heat transfer device 240. If water is used as the heat transfer medium in conduit 238, the heat transfer device 240 and the flow rates through the heat transfer device 240 can be set at predetermined values to yield steam in conduit 241.

The effluent from the first carbon black reactor 210 also passes via conduit 212 in contact with heat exchange devices 295 and 260. Thus, the flow rates of the various streams through heat exchange devices 240, 234, 295, 226, and 260 can be manipulated to control the temperature of the effluent from the carbon black reactor in conduit 212 which enters the first carbon black separation means 213. If valve 258 is open, a heat transfer medium in conduit 257 can pass in contact with heat exchange device 260 and exit via conduit 259. Thermal energy from the effluent of the carbon black reactor in conduit 212 can thus be transferred via heat exchange device 260 to the heat transfer medium in conduit 257. Preferably, the heat transfer medium in conduit 257 is water and the flow rate of the heat transfer medium through heat exchange device 260 is manipulated so that the temperature of the effluent from the carbon black reactor in conduit 212 which passes into the first carbon black separation means 213 is at a desired temperature. The heat exchange device 260 can thus serve as a trim or final temperature control device.

If valve 242 is open, a portion of the effluent from the carbon black reactor in conduit 212 passes via conduit 243 by means of a pump or blower means 244 into one or more positions in the downstream region of the carbon black reactor 210. The cooled reaction effluent in conduit 243 can be used to cool and control and/or quench the carbon black reaction in reactor 210.

The residual reaction gas from the first carbon black reactor 210 which is separated from the particles of carbon black produced in the first carbon black reactor in the first carbon black separation means 213 can have some fuel value. It is thus desirable to utilize this gas as a fuel gas. If valves 293, 393, 400, and 401 are closed and valve 254 is open, then the residual reaction gas from the first carbon black reactor 210 will exit the system via conduit 256 and can be directed to other uses or can be directed to proper disposal such as venting to atmosphere. If valves 254, 293, 393, 401, and 383 are closed and valves 400 and 382 are open, then the residual reaction gas from the first carbon black separation means 213 can be directed to a second carbon black reactor 310 via conduits 255, 381, and 391. If valve 383 is open and valve 382 is closed, then the residual reaction gas in conduit 381 can be directed in contact with a heat exchange device 384. A heat transfer medium containing energy in conduit 385 can pass in contact with heat exchange device 384 and the heat transfer medium in conduit 386 exiting the heat transfer device 384 can have transferred energy to the residual reaction gas.

If valves 254, 393, 383, and 401 are closed and valve 293 is open, then the residual reaction gas can pass via conduits 255 and 294 in contact with heat exchange device 295. Heat exchange device 295 is positioned in contact with the effluent from the first carbon black reactor 210 in conduit 212. If valves 254, 383, 293, 400, and 401 are closed, valves 393 and 382 are open, then the residual reaction gas from the first separation means 213 can pass via conduits 255 and 394 in contact with heat exchange device 395. Heat exchange device 395 is positioned in contact with the effluent from the second carbon black reactor 310 in conduit 312. Heat can be transferred from the effluent from the second carbon black reactor in conduit 312 to the residual reaction gas from the first carbon black reactor 210 by means of heat exchange device 395 to alternatively preheat the residual reaction gas used as a fuel gas for the second carbon black reactor 310.

The feedstock in conduit 320 can be the same feedstock or a different feedstock from the feedstock in conduit 220. If valve 324 is closed and valve 321 is open, then the feedstock in conduit 320 can pass via conduit 323 into the second carbon black reactor 310. If valve 321 is closed and valve 324 is open, then the feedstock in conduit 320 passes in contact with heat exchange device 326 and therefrom via conduit 325. Heat exchange device 326 is positioned in contact with the effluent from the second carbon black reactor in conduit 312. The preheated feedstock in conduit 325 can then pass via conduit 323 into the second carbon black reactor 310.

The oxygen-enriched stream in conduit 31 can be used in the manufacture of carbon black in the second carbon black reaction chain. If valve 329 and valve 335 is open and valve 332 is closed, then the oxygen-enriched gas can be directed via conduits 331 and 328 into the second carbon black reactor 310. If valve 329 and 332 are open and valve 335 is closed, then the oxygen-enriched gas can pass via conduit 331 and 333 in contact with heat exchange device 334. Heat exchange device 334 is positioned in contact with the effluent from the second carbon black reactor in conduit 312. Energy can thus be transferred from the effluent of the second carbon black reactor 310 in conduit 312 to the oxygen-enriched gas which is fed to the second carbon black reactor. The preheated oxygen-enriched gas in conduit 333 exits heat exchange device 334 and passes via conduit 328 into the second carbon black reactor. If valve 336 is open, then a diluent such as air can be admixed with the oxygen-enriched gas in conduit 331.

The mixture of diluent and oxygen-enriched gas can pass via conduits 331 and 333 in contact with heat exchange device 334. The mixture of diluent and oxygen-enriched gas can thus be preheated prior to feeding the mixture to the second carbon black reactor 310.

An alternate fuel, as described above, in conduit 392 can be admixed with the residual reaction gas from the first carbon black reactor 210 in conduit 255. The alternate fuel in conduit 392 can be used alone if it is desired to use no residual reaction gas from the first carbon black reactor. A mixture of residual reaction gas and alternate fuel can be directed through the various heat exchange devices 295, 395, and 384, if it is desired to preheat the mixture prior to using the mixture as a fuel gas for the second carbon black reactor 310.

A residual reaction gas from the first carbon black reactor 210 or a mixture of an alternate fuel and a residual reaction gas from reactor 210, in conduit 391, can be combusted as a fuel in the presence of an oxygen-containing gas in conduit 328. This combustion can be used to form a hot combustion gas which can decompose the feedstock charged to the second carbon black reactor in conduit 323 to form carbon black in the second carbon black reactor.

A quench fluid in conduit 337 can be injected into the second carbon black reactor 310 to cool and/or control or terminate the carbon black forming reaction in the second carbon black reactor. If valve 339 is open, heat transfer medium in conduit 338 can pass in contact with heat exchange device 340. Heat exchange device 340 is positioned in contact with the effluent from the second carbon black reactor in conduit 312. Heat is thus transferred to the heat transfer medium which exits the heat transfer device 340 in conduit 341. Preferably the heat transfer medium used is water and the exiting heat transfer medium stream in conduit 341 is steam. Heat is thus transferred from the carbon black reactor effluent and conduit 312 to the heat transfer medium and conduit 338. The heat transfer medium and conduit 338 simultaneously cools the effluent from the carbon black reactor in conduit 312.

Heat transfer devices 340, 334, 326, and 360 are all positioned in contact with the effluent from the second carbon black reactor in conduit 312. If valve 358 is open, a heat transfer medium in conduit 357 can pass in contact with heat exchange device 360 and exit as a heated heat transfer medium in conduit 359. The flow rates through the various heat transfer devices can be manipulated to achieve desired product stream temperatures and a desired degree of energy recovery from the effluent from the second carbon black reactor. Heat transfer device 360 can be operated in such manner to control the temperature of the effluent from the second carbon black reactor in conduit 312 entering the second carbon black separation means 313. If valve 342 is open, a portion of the cooled effluent from the second carbon black reactor in conduit 312 can be passed by means of a pump or blower means 344 and via conduit 343 to one or more positions downstream in the carbon black reaction zone. The cooled reactor effluent recycle stream in conduit 343 can thus be used as a quench fluid to cool and/or control or terminate the carbon black reaction in the second carbon black reactor 310.

If valve 403 is closed and valve 354 is open, then the residual reaction gas from the second carbon black separation means 313 exits the system via conduit 356 for proper disposal, such as venting to the atmosphere, or can be directed to other uses. Since the residual reaction gas from the second carbon black reactor 310 can have some fuel value, it can be desirable to utilize a portion of the residual reaction gas as a fuel gas in the manufacture of carbon black. If valve 354 is closed and valves 400, 403 and 401 are open, then the residual gas from the second carbon black separation means 313 can pass via conduits 355, 402, 381, and 391 to the second carbon black reactor 310. It is preferable to admix the residual reaction gas from the second carbon black reactor 310 in conduit 402 with a residual reaction gas from the first carbon black reactor 310 in conduit 255. The mixture of residual reaction gases can thus be used as a combined fuel gas for at least part of the fuel for the second carbon black reactor 310.

Residual reaction gas from the first and/or the second carbon black reactor can be used as a fuel gas to provide a heating medium for a boiler means. If valves 254, 354, 400, 404, 296, and 396 are closed and valves 401, 403, 405, and 407 are open, then residual reaction gas from the first carbon black reactor 210 can be directed from the first carbon black separation means 213 via conduits 255, 402, 406, and 417 to a boiler means 420. Also, a residual reaction gas from the second carbon black reactor 310 exiting the second carbon black separation means 313 can pass via conduits 355, 406 and 417 to the boiler means 420. Residual reaction gas streams can be combusted as a fuel in the presence of a free oxygen containing gas added to the boiler means 420 via conduit 418 to provide a heating medium which heats the boiler means 420. A combusted or spent residual reaction gas stream which was used as a fuel gas for the boiler means 420 can be vented as flue gas to the atmosphere via conduit 422. A relatively cool heat transfer medium such as water enters the boiler means 420 via conduit 421 and exits via conduit 419, preferably as steam, after obtaining thermal energy in the boiler means 420.

If valve numeral 414 is open, a heat transfer medium in conduit 415 such as water, a nitrogen-enriched gaseous stream, etc. can pass in contact with heat exchange device 425 and exit via conduit 416. Thus, energy can be transferred from a residual reaction gas to a heat transfer medium prior to using the residual reaction gas as a fuel gas.

A residual reaction gas can also be used as a fuel gas used to provide a heating medium for heating a means to remove a pelleting agent from carbon black pellets such as a drying chamber. If valves 254, 354, 400, and 404 are closed and valves 401, 403, 405, 296, and 396 are open, then at least a portion of a residual reaction gas from the first and/or second carbon black reactor can be directed via conduit 297 and/or 397 as fuel to drying chamber 215 and/or drying chamber 315. In drying chamber 215, residual reaction gas in conduit 297 can be combusted as a fuel gas in the presence of a free oxygen containing gas added via conduit 298.

In drying chamber 315, a residual reaction gas in conduit 397 can be combusted in the presence of a free oxygen containing gas in conduit 398 to form a heating medium. The heating medium so formed can be directed to a heating zone 371 which is in communication with and heats the shell 372 of the drying chamber 315. Pellets of carbon black containing excess pelleting agent can be positioned within the shell 372. The heated shell 372 can cause evaporation of excess pelleting agent from the pellets. The heating medium then exits the heating zone 371 via conduit 374 and preferably passes through a filter means 399 and is vented to the atmosphere via conduit 377. If valve 363 is open, a heat transfer medium such as water, a gaseous stream containing nitrogen, etc., can pass via conduit 364 in contact with heat exchange device 365. Thermal energy can thus be transferred from the heating medium effluent from the drying chamber 315 and conduit 374 to the heat transfer medium 364. The heat transfer medium in conduit 373 exiting the heat transfer device 365 can thus contain more energy than the heating medium in conduit 364.

A residual reaction gas in conduit 297 can likewise be used as a fuel gas to provide a heating medium for heating chamber 215. Energy can likewise be recovered from the effluent heating medium from drying chamber 215 and conduit 274 via heat exchange device 265. A residual reaction gas in conduit 297 can thus be combusted in the presence of a free oxygen containing gas in conduit 298. The combustion gas so formed can be passed to the heating zone 271 which is in communication with the shell 272 of the drying chamber 215. Pellets of carbon black containing excess pelleting agent can be placed within the shell 272. If valve 263 is open, a heat transfer medium in conduit 264 can pass in contact with heat exchange device 265. A heat transfer medium in conduit 264 exits via conduit 273 after having energy transferred to it via heat transfer device 265. The heating medium effluent in conduit 274 passes in contact with a filter means 299 and exits the system via conduit 277 and can be vented to the atmosphere.

The effluent from the first and/or second carbon black reactor can be cooled from a temperature in excess of 2000° F. to a temperature in the range of about 500°–2000° F. Preferably the effluent is cooled to a temperature in the range of about 300°–700° F. The residual reaction gas from the first and/or second carbon black reactor exiting the first and/or second carbon black separation means thus can have a temperature in the range of about 300°–700° F. Since the feedstock to the first and/or second carbon black reactor can be a sulfur-containing material, the residual reaction gas from each reaction can contain sulfur and/or sulfur-containing compounds. It is desirable to direct these gas streams to a sulfur removal means wherein sulfur is recovered from the gaseous streams. If valves 254, 354, 400 and 405 are closed and valves 401, 403, and 404 are open, then residual reaction gas from the first carbon black separation means 213 and the second carbon black reaction means 313 can be directed to a sulfur removal means.

The main sulfur component is $H_2S$ and can be removed from the gas as by an amine scrubber or the like 410.

A residual reaction gas from the first carbon black reactor 210 exiting the first carbon black separation means 213 via conduit 255 can be directed via conduits 255, 402 and 409 to a sulfur removal means 410. Likewise, residual reaction gas from the second carbon black reactor 310 exiting the second carbon black separation means 313 can be directed via conduit 355 and 409 to a sulfur removal means 410. Sulfur-containing compounds can be directed from the sulfur removal means 410 via conduit 412 to a sulfur converter 411 wherein sulfur-containing compounds can be reduced to elemental sulfur which is removed from the system via conduit 413. $SO_2$ can be added or can be produced from part of the recovered $H_2S$. The reaction $2H_2S + SO_2 \rightarrow 2H_2O + 3S$ can occur in the sulfur conversion means. A residual reaction gas having reduced sulfur content can be directed from the sulfur removal means 410 via conduit 406 for use as a fuel gas for a boiler means, a drying means, etc.

Preferably, the nitrogen-enriched gas in conduit 50 is directed to at least one means for removing a pelleting agent from pellets of carbon black such as a drying chamber. A nitrogen-enriched gaseous stream in conduit 50 can be directed via conduit 268 to drying chamber 215 as a purge gas. The purge gas can exit the system via conduit 280. Nitrogen-enriched gaseous stream in conduit 50 can be directed via conduit 368 to drying chamber 315 as a purge gas. Purge gas can exit drying chamber 315 via conduit 380.

The above description also should not be read in an unduly limiting manner. Those skilled in the art, for example, will realize that the composition, temperature, pressure, and/or flow rate of various process streams can be adjusted to achieve an optimum energy conservation level for the overall process. For example, it is understood that a residual reaction gas from the first carbon black reactor exiting the first carbon black separation means 213 can be simultaneously used as a fuel gas for the second carbon black reactor 310, a fuel gas for a first drying means 215, a fuel gas for the second drying means 315, a fuel gas for the boiler means 420, and a feed stock from the sulfur removal means 410 and sulfur conversion means 411. Alternatively, or simultaneously, the residual gas from the second carbon black reactor exiting the second carbon black separation means 313 can be used as a fuel gas for the second carbon black reactor 310, a fuel gas for the first drying means 215, a fuel gas for the second drying means 315, a fuel gas for the boiler means 420, and a feedstock for the sulfur removal means 410 and sulfur conversion means 411.

Reasonable variations and modifications which will become apparent to those skilled in the art can be made in this invention without departing from the spirit and scope thereof.

What is claimed is:
1. comprising:
 (a) feeding air to an air separation means to form a first gaseous stream comprising at least 95 volume percent nitrogen and a second gaseous stream comprising at least 50 volume percent free oxygen,
 (b) feeding at least a portion of said second gaseous stream comprising at least 50 volume percent free oxygen to a first carbon black reactor,
 (c) feeding a feedstock to said first carbon black reactor,
 (d) combusting at least a portion of said feedstock to said first carbon blak reactor in the presence of said second gaseous stream comprising at least 50 volume percent oxygen to form a hot combustion gas,
 (e) decomposing at least a portion of said feedstock fed to said first carbon black reactor in the presence of said hot combustion gas of (d) in said first carbon black reactor under conditions conducive to the formation of carbon black to form an effluent of said first carbon black reactor comprising carbon black and residual reaction gas,
 (f) passing a quench fluid to said first carbon black reactor to cool the effluent of said carbon black reactor to a temperature in the range of about 1200° to about 2000° F.,
 (g) directing the effluent of said first carbon black reactor to a first carbon black separation means wherein at least a portion of said carbon black formed in said first carbon black reactor is separated from said residual reaction gas of the first carbon black reactor,
 (h) recovering the carbon black formed in said first carbon black reactor and separated from the residual reaction gas of said first carbon black reactor,
 (i) feeding at least a portion of the residual reaction gas from the first carbon black reactor to a second carbon black reactor as a fuel gas,
 (j) feeding at least a portion of said second gaseous stream comprising at least 50 volume percent oxygen to said second carbon black reactor,
 (k) feeding a feedstock to said second carbon black reactor,
 (l) combusting at least a portion of said residual reaction gas from the first carbon black reactor which is fed to said second carbon black reactor as a fuel gas in the presence of at least a portion of said second gaseous stream comprising at least 50 volume percent oxygen to form a hot combustion gas,
 (m) combusting at least a portion of said feedstock fed to said second carbon black reactor in the presence of at least a portion of said second gaseous stream comprising at least 50 volume percent oxygen to form a hot combustion gas,
 (n) decomposing at least a portion of said feedstock fed to said second carbon black reactor in the presence of said hot combustion gas of (l) and (m) and said second carbon black reactor under conditions conducive to the formation of carbon black to form an effluent from said second carbon black reactor comprising carbon black in a residual reaction gas,
 (o) passing a quench flow to said second carbon black reactor to cool the effluent of said second carbon black reactor to a temperature in the range of about 1200° to about 2000° F.,
 (p) directing the effluent from said second carbon black reactor to a second carbon black separation means wherein at least a portion of said carbon black formed in said second carbon black reactor is separated from said residual reaction gas of said second carbon black reactor, and
 (q) recovering the carbon black formed in said second carbon black reactor and separated from the residual reaction gas of said second carbon black reactor
 (r) feeding said carbon black separated from said residual reaction gas of said first carbon black reactor or said second carbon black reactor to a pelleting means,
 (s) introducing a pelleting agent to said pelleting means,
 (t) admixing said pelleting agent with said carbon black in said pelleting means to form pellets of carbon black,
 (u) feeding the pellets of carbon black to a means for removing excess pelleting agent from said pellets of carbon black in the presence of at least a portion of said first gaseous stream comprising at least 95 volume percent nitrogen, and
 (v) recovering the pellets of carbon black so formed.

2. A process in accordance with claim 1 wherein said residual reaction gas from said first or said second carbon black reactor comprises sulfur and at least a portion of said residual reaction gas is passed to a sulfur removal means wherein at least a portion of the sulfur is removed from said residual reaction gas to form a residual reaction gas having a reduced sulfur content.

3. A process in accordance with claim 2 wherein said residual reaction gas having a reduced sulfur content is used a fuel for said means for removing excess pelleting agent from pellets of carbon black.

4. A process in accordance with claim 1 wherein at least a portion of said residual reaction gas from said first carbon black reactor or said residual reaction gas from said second carbon black reactor is directed to a sulfur recovery means.

5. A process in accordance with claim 1 wherein said residual reaction gas from said first carbon black reactor or said residual reaction gas from said second carbon black reactor is admixed with a free oxygen containing gas and is combusted to form a heating medium.

6. A process to produce a carbon black product comprising
(a) feeding air to an air separation means to form a first gaseous stream comprising at least 95 volume percent nitrogen and a second gaseous stream comprising at least 50 volume percent free oxygen,
(b) feeding a feedstock to a carbon black reactor,
(c) introducing at least a portion of said second gaseous stream comprising at least 50 volume percent free oxygen into said carbon black reactor for combustion to form a hot combustion gas,
(d) decomposing at least a portion of said feedstock in the presence of said hot combustion gas to form an effluent from said carbon black reactor comprising carbon black and reaction off-gas,
(e) separating carbon black from said effluent to produce carbon black and separation off-gas,
(f) pelleting said carbon black in the presence of a pelleting agent to form carbon black pellets containing pelleting agent,
(g) heating at least a portion of said first stream containing at least 95 volume percent nitrogen to produce a heated nitrogen stream,
(h) purging said carbon black pellets containing pelleting agent in a dryer with the heated nitrogen stream to produce dried carbon black pellets,
(i) recovering said dried carbon black pellets as the product of the process.

7. A process in accordance with claim 5 wherein said at least a portion of said first stream is heated by passing it into indirect heat exchange with at least one of the following streams:
(a) said separation off-gas,
(b) said effluent from said carbon black reactor after being precooled,
(c) the dryer off-gas, being the heating medium having passed through said dryer.

8. A process in accordance with claim 5 wherein said at least a portion of said second gaseous stream is first heated by indirect heat exchange with said effluent and then passed into said carbon black reactor, and wherein the thereby effected cooling of the effluent constitutes a portion of said being precooled of said effluent.

9. A process in accordance with claim 5 comprising
(a) introducing a further carbonaceous feedstock into a further carbon black reactor,
(b) passing a further portion of said second gaseous stream comprising at least 50 volume percent free oxygen into said further carbon black reactor for combustion to form a further hot combustion gas,
(c) decomposing at least a portion of said further feedstock in the presence of said further hot combustion gas in said further carbon black reactor to form a further effluent from said further carbon black reactor comprising further carbon black and further reaction off-gas,
(d) separating further carbon black from said further effluent to produce further carbon black and further separation off-gas,
(e) pelleting said further carbon black in the presence of a further pelleting agent to form further carbon black pellets containing further pelleting agent,
(f) heating at least a further portion of said first stream containing at least 95 volume percent nitrogen to produce a further heated nitrogen stream,
(g) purging said further carbon black pellets containing said further pelleting agent in a further dryer with the further heated nitrogen stream to produce further dried carbon black pellets,
(h) recovering said further dried carbon black pellets as a further product of the process,
(i) introducing said further separation off-gas into said carbon black reactor as fuel for said combustion,
(j) using said separation off-gas as fuel for combustion to heat said dryer.

10. Process in accordance with claim 9 wherein at least one of said separation off-gas and said further separation off-gas is first passed through a sulfur removal stage and the so desulfurized gas is passed to its respective combustion stage.

* * * * *

UNITED STATES PATENT AND TRADEMARK OFFICE
CERTIFICATE OF CORRECTION

PATENT NO. : 4460558

DATED : July 17, 1984

INVENTOR(S) : Paul H. Johnson

It is certified that error appears in the above-identified patent and that said Letters Patent is hereby corrected as shown below:

Claim 1, column 23, line 40, "A process for the manufacture of carbon black" has been omitted from the beginning of the claim.

Claim 1, column 23, line 51, after "carbon" change "blak" to --- black ---.

Claim 7, column 25, line 44, change dependency of claim from "5" to --- 6 ---.

Claim 8, column 26, line 5, change dependence of claim from "5" to --- 7 ---.

Claim 9, column 26, line 11, change dependency of claim from "5" to ---6---.

Signed and Sealed this

Twenty-eighth Day of October, 1986

[SEAL]

*Attest:*

DONALD J. QUIGG

*Attesting Officer*  *Commissioner of Patents and Trademarks*